(12) United States Patent
Kim (10) Patent No.: US 9,726,242 B2
(45) Date of Patent: Aug. 8, 2017

(54) CALIPER UNIT FOR VEHICLE

(71) Applicants: Hyundai Motor Company, Seoul (KR); Kia Motors Corporation, Seoul (KR)

(72) Inventor: Tae Heon Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/884,398

(22) Filed: Oct. 15, 2015

(65) Prior Publication Data

US 2016/0327106 A1 Nov. 10, 2016

(30) Foreign Application Priority Data

May 8, 2015 (KR) .................... 10-2015-0064755

(51) Int. Cl.
*F16D 65/00* (2006.01)
*F16D 55/225* (2006.01)
*F16D 55/00* (2006.01)
*F16D 125/36* (2012.01)

(52) U.S. Cl.
CPC ....... *F16D 65/0068* (2013.01); *F16D 55/225* (2013.01); *F16D 2055/0016* (2013.01); *F16D 2125/36* (2013.01)

(58) Field of Classification Search
CPC .. F16D 65/18; F16D 65/0075; F16D 65/0068; F16D 55/225; F16D 2055/016; F16D 2125/20; F16D 2125/28

USPC ...................... 188/72.7, 72.8, 72.9
See application file for complete search history.

(56) References Cited

U.S. PATENT DOCUMENTS

| 4,159,754 A * | 7/1979 | Airheart ................. F16D 65/54 188/106 F |
| 2012/0292137 A1* | 11/2012 | Yoshikawa ............ F16D 65/18 188/71.7 |
| 2014/0020991 A1* | 1/2014 | Kong ...................... F16D 65/18 188/72.3 |

FOREIGN PATENT DOCUMENTS

| JP | 2006-38163 A | 2/2006 |
| JP | 2006105170 A * | 4/2006 |
| JP | 2006-283811 A | 10/2006 |
| JP | 2010-54038 A | 3/2010 |
| JP | 2014-20554 A | 2/2014 |

* cited by examiner

*Primary Examiner* — Melanie Torres Williams
(74) *Attorney, Agent, or Firm* — Morgan Lewis & Bockius LLP (57) ABSTRACT

A caliper unit may include a piston configured to linearly reciprocate in a cylinder, a pushrod configured to move along with the piston, an operating ramp configured to linearly move the pushrod in one direction, a high compression spring supported by the cylinder and configured to restore the pushrod to an original position, and a floating ramp interposed between the high compression spring and the operating ramp to transfer elastic force of the high compression spring to the operating ramp.

6 Claims, 6 Drawing Sheets

CALIPER UNIT FOR VEHICLE

CROSS-REFERENCE TO RELATED APPLICATION

The present application claims priority to Korean Patent Application No. 10-2015-0064755 filed May 8, 2015, the entire contents of which is incorporated herein for all purposes by this reference.

BACKGROUND OF THE INVENTION

Field of the Invention

The present invention relates to a caliper unit for a vehicle. More particularly, the present invention relates to a caliper unit for a vehicle to which a floating ramp structure is applied.

Description of Related Art

In general, a brake device as a damping device of a vehicle is a main device used to decelerate or stop a driving vehicle and a drum brake and a disk brake as a hydraulic brake have been used.

The disk brake is a device that presses a brake pad to a disk to stop a vehicle. Recently, a disk brake with excellent braking performance has been mainly used compared with the drum brake.

The disk brake includes a disk that integrally rotates with a wheel and a caliper unit. The caliper unit includes an operating lever that moves in a rotary manner and a piston that linearly moves forward or backward by rotation of the operating lever.

According to a method for switching rotary motion of the operating lever to linear motion, the caliper unit may be classified into various caliper units. A representative example is a ball in ramp (BIR) caliper.

The BIR caliper includes an operating ramp connected to an operating lever and rotating along with the operating lever, a corresponding ramp configured to face the operating ramp, and a ball or roller ("rotating member") interposed between the operating ramp and the corresponding ramp. As the operating ramp rotates, the rotating member linearly moves forward or backward.

As such, the operating ramp linearly moves by the linearly moving rotating member as well, and the piston receives force from the operating ramp and moves forward or backward.

The BIR caliper further includes a high compression spring, a low compression spring, and a stopper. The high compression spring and the low compression spring are used to restore the piston to an original position, and the stopper is disposed to connect the springs in series to each other between the high compression spring and the low compression spring.

When the operating ramp moves backward in front of the stopper, the high compression spring pushes the stopper such that the piston also moves backward. The low compression spring further pushes the operating ramp backward such that the piston further moves backward as much as built in clearance (BIC). According to prior art, the piston moves backward by the high compression spring and the low compression spring that are connected in series to each other using the stopper as a medium, thereby reducing drag in a disk.

However, according to prior art, the low compression spring is easily and permanently deformed. When the low compression spring is permanently deformed, the length thereof is reduced, and accordingly the piston is not capable of moving backward as much as the BIC. In addition, as the rotating ramp reversely rotates, backward movement of the piston may be impeded. Accordingly, the brake pad does not sufficiently rotate backward to cause drag.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a caliper unit for a vehicle, in which a floating ramp is interposed between a high compression spring and low compression spring and an operating ramp.

According to various aspects of the present invention, a caliper unit may include a piston configured to linearly reciprocate in a cylinder, a pushrod configured to move along with the piston, an operating ramp configured to linearly move the pushrod in one direction, a high compression spring supported by the cylinder and configured to restore the pushrod to an original position, and a floating ramp interposed between the high compression spring and the operating ramp to transfer elastic force of the high compression spring to the operating ramp.

The caliper unit may further include a supporting member internally protruding from an inner circumference of the cylinder in a radial direction, and a low compression spring configured to further move the pushrod backward, in which one side of the high compression spring and the low compression spring may be supported by the supporting member.

The floating ramp may include a main body formed with a cylinder shape, a protruding portion protruding from a first surface of the main body to one side in an axial direction, a depression portion formed with a sinking shape from a second surface of the main body to the one side in the axial direction, and a depression surface formed on the second surface of the main body in the depression portion, in which a penetration hole may be formed in the protrusion portion so that the pushrod passes through the protrusion portion.

The high compression spring and the low compression spring may be disposed in parallel.

The caliper unit may further include a ramp flange externally extending in a radial direction from one side of the operating ramp, a corresponding ramp disposed in the cylinder so as to face the ramp flange, an operating lever configured to transfer torque to the operating ramp, and a rotating member disposed between the ramp flange and the corresponding ramp and configured to linearly move while rotating together during rotation of the ramp flange.

The pushrod may include an installation portion having a step difference formed in an external side in a radial direction so as to install the low compression spring, and an extension portion having a step difference from another side of the installation portion to the external side in a radial direction, in which one surface of the extension portion may contact the depression surface.

A predetermined separation distance may be formed between the depression surface and the one surface of the extension portion when the pushrod is restored to an original state before braking force is applied.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
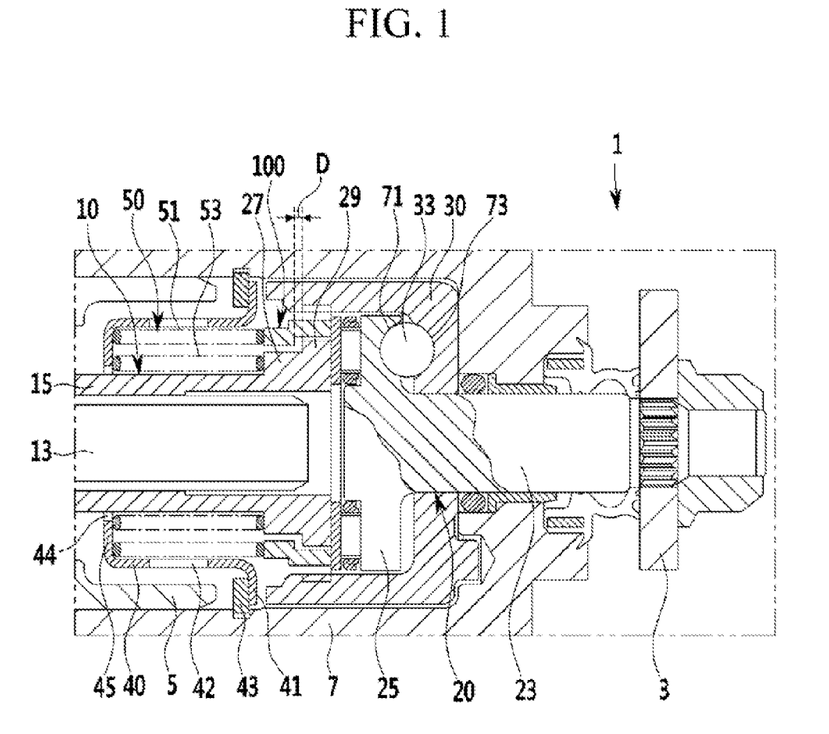
FIG. 1 is a cross-sectional view of an exemplary caliper unit according to the present invention.
Figure 2:
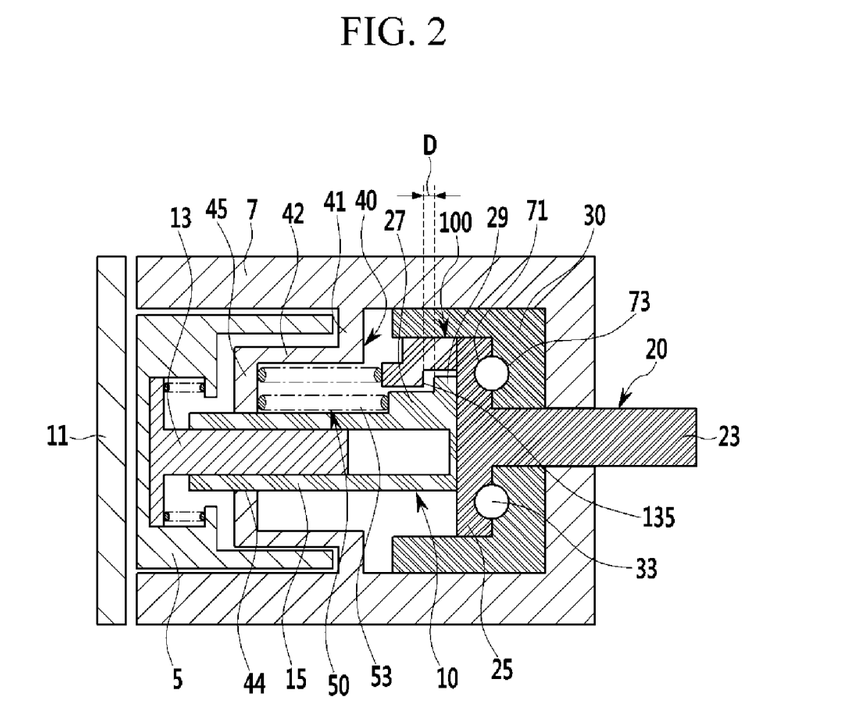
FIG. 2 is a schematic diagram of an exemplary caliper unit prior to application of braking force according to the present invention.
Figure 3:
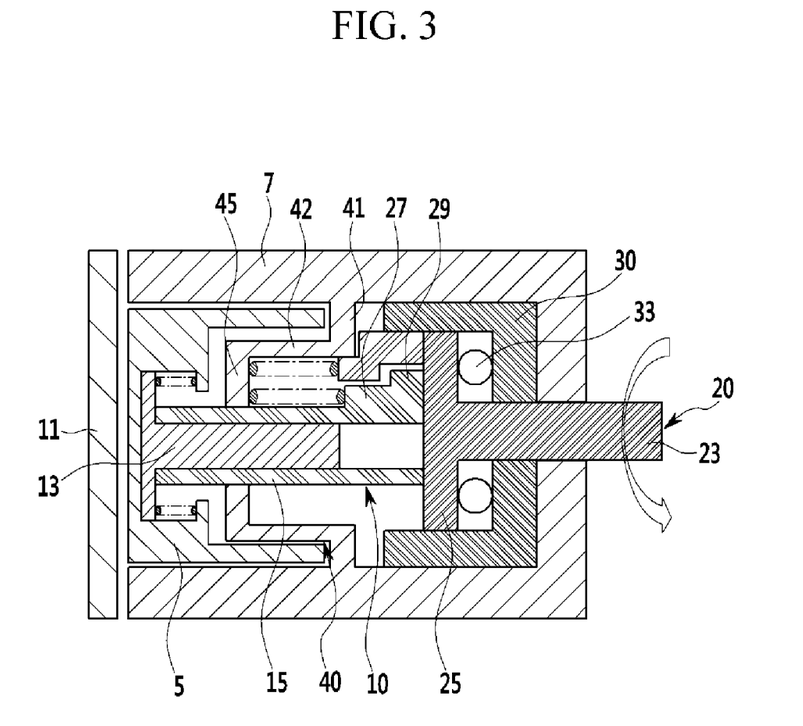
FIG. 3 is a schematic diagram of an exemplary caliper unit after application of braking force according to the present invention.
Figure 4:
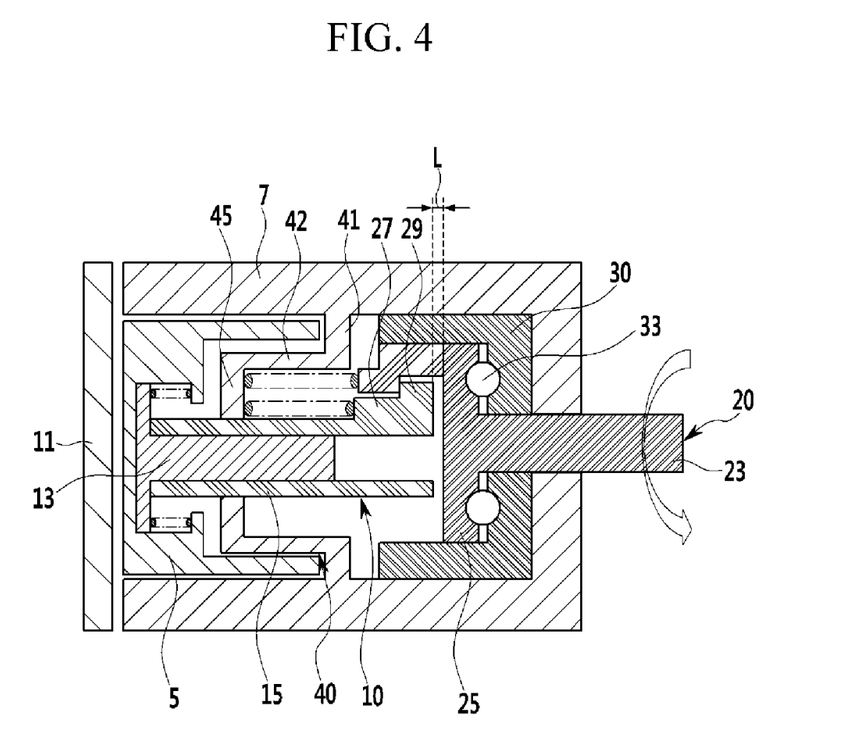
FIG. 4 is a schematic diagram of an exemplary caliper unit after braking force is released according to the present invention.

FIG. 1 is a cross-sectional view of a caliper unit 1 according to various embodiments of the present invention. FIG. 2 is a schematic diagram of the caliper unit 1 prior to application of braking force according to various embodiments of the present invention. FIG. 3 is a schematic diagram of the caliper unit 1 after application of braking force according to various embodiments of the present invention. FIG. 4 is a schematic diagram of the caliper unit 1 after braking force is released according to various embodiments of the present invention.

Referring to FIG. 1 to FIG. 4, the caliper unit 1 according to various embodiments of the present invention includes a cylinder 7 with one opened side and a piston 5 for pressurizing a brake pad 11 in a radial internal side of the cylinder 7. The brake pad 11 may receive force from the piston 5 to contact or be non-contacted with a disk so as to stop the vehicle or release stoppage of the vehicle.

For stopping the vehicle or releasing stoppage of the vehicle, the caliper unit 1 includes an operating lever 3, an operating ramp 20, a corresponding ramp 30, a pushrod 10, a supporting member 40, and a spring portion 50.

The operating lever 3 is a device for applying braking force to the operating ramp 20 and is configured to rotatably move by braking force received from a parking handle included in the vehicle. However, the operating lever 3 may not be limited thereto and may rotatably move via other methods.

The operating ramp 20 may rotatably move along with the operating lever 3. The operating ramp 20 includes a ramp shaft 23 for transferring torque received from the operating lever 3 to an internal side of the cylinder 7, and a ramp flange 25 that externally extends from one lateral end of the ramp shaft 23 in a radial direction. The ramp flange 25 includes a flange raceway 71 formed on the other surface thereof.

The corresponding ramp 30 is disposed to face the ramp flange 25 in the cylinder 7. The corresponding ramp 30 includes a corresponding raceway 73 formed on one surface thereof.

A rotating member 33 may be disposed between the flange raceway 71 and the corresponding raceway 73. The rotating member 33 may rotate around the ramp shaft 23 along with rotation of the ramp flange 25.

The flange raceway 71 and the corresponding raceway 73 may be formed to be inclined based on a length direction of the cylinder 7. Accordingly, when the ramp flange 25 rotates, the rotating member 33 may move forward or backward along an inclination surface.

The operating ramp 20 may receive force from the rotating member 33 that linearly moves to linearly move. According to various embodiments of the present invention, rotary motion may be switched to linear motion by the rotating member 33, but the present invention is not limited thereto, and rotary motion may be switched to linear motion using various methods.

The pushrod 10 may extend in an axial direction and receive force from the operating ramp 20 to move to one side in the axial direction. In this case, an adjuster 13 installed in an internal side of the pushrod 10 in a radial direction may receive force from the pushrod 10 to press the piston 5 forward.

The pushrod 10 includes a cylinder portion 15 with the adjuster 13 inserted thereinto, an installation portion 27 that externally extends from the other side of the cylinder portion 15 in a radial direction and includes a low compression spring 53 installed therein, and an extension portion 29 that further externally extends from the other side of the installation portion 27 in a radial direction compared with the installation portion 27. By virtue of the extension portion 29, the pushrod 10 receives force from the operating ramp 20 with respect to a wide area.

The supporting member 40 internally extends from an inner circumference of the cylinder 7 in a radial direction and is included in the form of a plurality of curved pieces in the cylinder 7. In more detail, the supporting member 40 includes a pair of radial extension portions 41 that are coupled to the cylinder 7 via a circlip 43 and internally extend in a radial direction, a pair of axial extension portions 42 that extend from an internal lateral end of the pair of radial extension portions 41 to one side in an axial direction, and a support portion 45 that connects one lateral end of each of the pair of axial extension portions 42 to each other and extends in a radial direction. The support portion 45 may include an insertion hole 44 formed therein, and the pushrod 10 may be inserted into the insertion hole 44.

The spring portion 50 is supported by the support portion 45 and restores the pushrod 10 to an original position. The spring portion 50 includes the high compression spring 51 and the low compression spring 53. One lateral end of the each spring 51 and 53 is supported by the support portion 45.

The high compression spring 51 is formed with relatively high modulus of elasticity compared with the low compression spring 53 and the other lateral end of the high compression spring 51 is installed at a floating ramp 100. The other end of the low compression spring 53 is installed at one lateral end of the installation portion 27. As such, the high compression spring 51 and the low compression spring 53 may be disposed in parallel.

Accordingly, when the pushrod 10 is restored to an original position, the floating ramp 100 moves backward by the high compression spring 51 and then the pushrod 10 further moves as much as built in clearance (BIC) by the low compression spring 53. Load applied to the low compression spring 53 is reduced, thereby preventing the low compression spring 53 from being permanently deformed.

Figure 5:
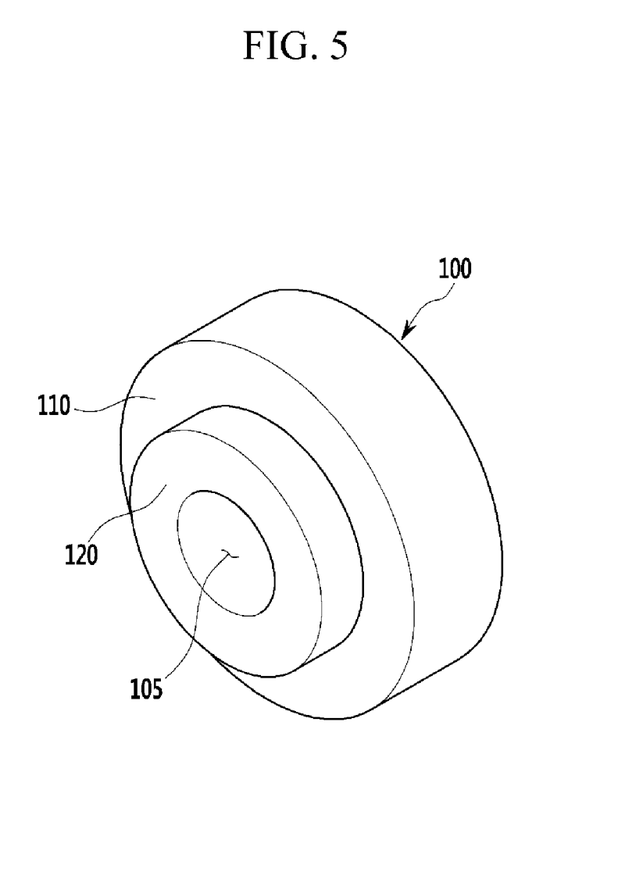
FIG. 5 is a front perspective view of a floating ramp of an exemplary caliper unit according to the present invention.
Figure 6:
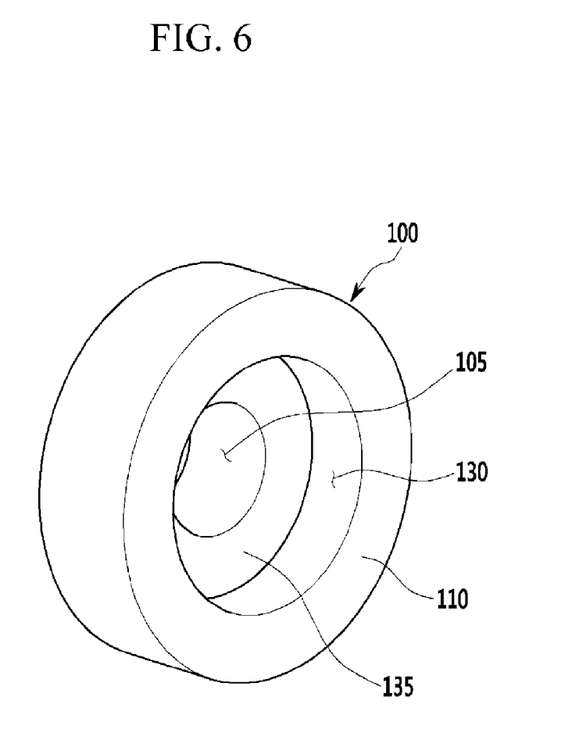
FIG. 6 is a rear perspective view of a floating ramp of an exemplary caliper unit according to the present invention.

FIG. 5 is a front perspective view of the floating ramp 100 of the caliper unit 1 according to various embodiments of the present invention. FIG. 6 is a rear perspective view of the floating ramp 100 of the caliper unit 1 according to various embodiments of the present invention.

The caliper unit 1 according to various embodiments of the present invention further includes the floating ramp 100. Referring to FIG. 1 to FIG. 6, the floating ramp 100 is disposed between the high compression spring 51 and the operating ramp 20. The floating ramp 100 includes a main body 110 and a protruding portion 120, and a depression portion 130 is formed in the other surface of the floating ramp 100.

The main body 110 is formed with a cylinder shape, and the protruding portion 120 is concentric with the main body 110 and protrudes from one surface of the main body 110 to one side in an axial direction. The protruding portion 120 may include a penetration hole 105 formed therein and the pushrod 10 may be inserted through the penetration hole 105. In addition, the high compression spring 51 may be installed at one end of the protruding portion 120.

The depression portion 130 with a sinking shape in terms of one axial side is formed on the other surface of the main body 110 so as to have the same radius as the protruding portion 120. In addition, a depression surface 135 is formed in the depression portion 130 on the other surface of the main body 110. The protruding portion 120 may be disposed outside the installation portion 27 in a radial direction, and the extension portion 29 may be disposed in the depression portion 130.

According to various embodiments of the present invention, the operation of the caliper unit 1 including the floating ramp 100 interposed therein will be described below in detail.

As shown in FIG. 2, before braking force is applied to the operating ramp 20, the operating ramp 20 does not move forward. Accordingly, the floating ramp 100 including the high compression spring 51 installed therein and the pushrod 10 including the low compression spring 53 installed therein move backward by elastic force. Accordingly, the other end of the floating ramp 100 and pushrod 10 come in contact with the ramp flange 25. In addition, a first spacing space D is formed between the depression surface 135 of the floating ramp 100 and one surface of the extension portion 29 of the pushrod 10.

As shown in FIG. 3, after braking force is applied to the operating ramp 20, the operating ramp 20 moves forward. Accordingly, the pushrod 10 and the piston 5 simultaneously move forward by the operating ramp 20.

As shown in FIG. 4, when braking force applied to the operating ramp 20 is released, the operating ramp 20 receives restoring force of the high compression spring 51 through the floating ramp 100. Accordingly, the operating ramp 20 may move backward and prevent the operating ramp 20 from rotating in a reverse direction. In this case, a second spacing space L is generated between the other surface of the pushrod 10 and one surface of the operating ramp 20.

In addition, after the operating ramp 20 completely moves backward by the high compression spring 51, the pushrod 10 further moves backward by the low compression spring 53 as much as the second spacing space L. As such, as shown in FIG. 2, the caliper unit 1 is restored to an original state before braking force is applied to the operating ramp 20. In this case, the first spacing space D may be smoothly ensured again.

According to various embodiments of the present invention, the floating ramp 100 may be disposed between the high compression spring 51 and the operating ramp 20, thereby minimizing load applied to the low compression spring 53 to prevent the low compression spring 53 from being permanently deformed. In addition, the caliper unit 1 may move backward sufficiently as much as the second spacing space L, thereby reducing drag in a disk.

As described above, according to various embodiments of the present invention, a floating ramp may be interposed so as to prevent a low compression spring from being permanently deformed, and the piston may sufficiently move backward as much as the BIC so as to reduce drag, thereby preventing the operating ramp from rotating in a reverse direction.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A caliper unit comprising:
a piston configured to linearly reciprocate in a cylinder;
a pushrod configured to move along with the piston;
an operating ramp configured to linearly move the pushrod in one direction;

a high compression spring supported by the cylinder and configured to restore the pushrod to an original position; and a floating ramp interposed between the high compression spring and the operating ramp to transfer elastic force of the high compression spring to the operating ramp, wherein the pushrod comprises:

an installation portion having a step difference formed in an external side in a radial direction so as to install a low compression spring; and an extension portion having a step difference from another side of the installation portion to the external side in a radial direction, wherein one surface of the extension portion contacts a depression surface of the floating ramp.

2. The caliper unit of claim 1, further comprising:

a supporting member internally protruding from an inner circumference of the cylinder in a radial direction; and the low compression spring configured to further move the pushrod backward, wherein one side of the high compression spring and the low compression spring is supported by the supporting member.

3. The caliper unit of claim 2, wherein the floating ramp comprises:

a main body formed with a cylinder shape;

a protruding portion protruding from a first surface of the main body to one side in an axial direction;

a depression portion formed with a sinking shape from a second surface of the main body to the one side in the axial direction; and the depression surface formed on the second surface of the main body in the depression portion, wherein a penetration hole is formed in the protrusion portion so that the pushrod passes through the protrusion portion.

4. The caliper unit of claim 2, wherein:

the high compression spring and the low compression spring are disposed in parallel.

5. The caliper unit of claim 3, further comprising:

a ramp flange externally extending in a radial direction from one side of the operating ramp;

a corresponding ramp disposed in the cylinder so as to face the ramp flange;

an operating lever configured to transfer torque to the operating ramp; and a rotating member disposed between the ramp flange and the corresponding ramp and configured to linearly move while rotating together during rotation of the ramp flange.

6. The caliper unit of claim 1, wherein:

a predetermined separation distance is formed between the depression surface and the one surface of the extension portion when the pushrod is restored to an original state before braking force is applied.

\* \* \* \* \*